United States Patent [19]

Kartman

[11] 3,932,096
[45] Jan. 13, 1976

[54] MOLD FOR THERMOFORMING PLASTIC SHEET MATERIAL

[76] Inventor: Walter Kartman, 1729 Glenridge Circle, West Covina, Calif. 91792

[22] Filed: June 10, 1974

[21] Appl. No.: 477,688

[52] U.S. Cl. ......... 425/398; 249/79; 425/DIG. 208; 425/DIG. 211
[51] Int. Cl.² ................................. B29C 17/00
[58] Field of Search ....... 249/79, 80, 113, 135, 134; 425/130, 398

[56] References Cited
UNITED STATES PATENTS

| | | | |
|---|---|---|---|
| 2,510,907 | 6/1950 | Renaud | 249/79 |
| 3,601,857 | 8/1971 | Hampel | 249/134 |
| 3,617,369 | 11/1971 | Lombardo | 249/80 |

Primary Examiner—Robert L. Spicer, Jr.
Assistant Examiner—Robert J. Charvat
Attorney, Agent, or Firm—Irons and Sears

[57] ABSTRACT

A molding apparatus for thermoforming plastic sheet material having upper and lower matching molding blocks, each molding block having a thin rigid shell. The shell has a die cavity therein with the exposed face of the shell defining the die cavity surface. A porous body of metallic filler material is contained within the central portion of each molding block and is in contact with the inner surface of the rigid shell. Inlet and outlet means are provided for circulating a coolant fluid through the central portion of each molding block.

9 Claims, 2 Drawing Figures

3,932,096

MOLD FOR THERMOFORMING PLASTIC SHEET MATERIAL

BACKGROUND OF THE INVENTION

1. Field of the Invention

This invention relates to the control of temperature in molding apparatus, and more particularly to a molding apparatus or thermoforming plastic sheet material having improved temperature control throughout the apparatus.

2. Description of the Prior Art

Heretofore, it has not been practical to employ plastic molds for thermoforming plastic sheeting. Plastic and synthetic resin dies have been considered in connection with the molding of small articles, but such dies have not been adapted to the molding of larger articles for various reasons including, particularly, adequate temperature control. Synthetic resin materials such as epoxy or phenolic resins which might possibly be used in the dies are heat and electrical insulators of a type which increases the temperature control problem. The poor heat conductivity of such material would ordinarily materially increase the molding cycle in view of the additional time required to heat or cool the entire body of the resin. Although it has been suggested that using an epoxy resin filled with metal particles would impart semi-thermal conductivity to the mold, it has been found that conventional potting resins are too poor in heat transfer characteristics even when a metal powder or alumina filler is used. It has further been suggested that mounting or embedding cooling coils in the body of the resin through which water is circulated will enhance the temperature control characteristics of the mold. It has been found, however, that even when the body of the resin is cooled by such coils embedded therein and is filled with metal particles the heat transfer problem is not alleviated to the extent necessary to permit high speed operation of the mold. The practicability of any commercial molding apparatus is greatly dependant upon the speed and efficiency with which such apparatus can be operated.

U.S. Pat. Nos. 2,869,179 and 2,907,070 disclose molding apparatus of the type described above in which the body of the resin which forms the mold is filled with metal particles and has cooling coils through which water is circulated embedded therein. The heat transfer characteristics of the patented apparatus do not permit the high speed molding operations which can be employed in the operation of the molding apparatus of the present invention. In the operation of the patented apparatus, the metallic outer surface of the mold is gradually heated to a temperature above the chill temperature of the plastic sheet. Thus, when the mold is closed, the plastic sheet is deformed but does not take a "set" because it is not quenched to a temperature below its deformation temperature. As a result, a dwell period is required to cool the mold and plastic sheet together.

SUMMARY OF THE INVENTION

The disadvantages and limitations of the prior art are alleviated by the present invention. The present invention includes a molding apparatus for thermoforming plastic sheet material having upper and lower matching molding blocks. The molding blocks may be, for example, in the shape of matching male to female members, the body of each molding block being formed of a thin rigid shell. The lower molding block shell has a die cavity which is a male to female match to the die cavity of the upper molding block shell, with the exposed face of each shell defining the surface of each die cavity. The central portion of each molding block is filled with a porous body of metallic material, such as chopped wires, wool-like shavings, irregular shaped particles, spherical beads, or the like. Although the shape of the filler material is not a significant factor, particles having an irregular shape are more likely to break up any channeling of the coolant fluid through the molding block. The porous body of filler material may comprise a relatively continuous mass such as the metallic shavings in steel wool or it may comprise particulate metallic material loosely contained within each molding block or permanently fixed in position to prevent it from being compacted during the flow of a coolant fluid therethrough or under the stamping pressure of the molding operation.

If superior heat transfer characteristic is desired, the thin rigid shell may comprise a layer of sheet metal, such as aluminum which has excellent heat transfer properties. Likewise, a superior heat transfer characteristic may be obtained by employing a shell comprising a metallic material that has been suitably treated to promote adhesion and a high temperature epoxy resin. The metallic material used in the shell may be in the form of metallic flakes, wires, rods, or the like, and the metallic content of the shell is maximized in order to impart the best possible heat transfer characteristic to the shell. When metallic material is included within the shell, it should preferably be potted such that it contacts the surfaces of the metallic filler material contained within the central portion of the molding block. In this regard, it is additionally preferable that the metallic material in the shell be of irregular shape so that there will be more metallic surface area available to contact the metallic filler material in the central portion thereby increasing the heat transfer capabilities of the mold. To further enhance the heat transfer characteristic of the mold, the body of metallic filler material preferably consists of particulate metallic material loosely contained within the central portion of each molding block since the mobility of the particulate filler material is directly related to the heat transfer capabilities of the mold. Baffles may be included within the central portion of the molding block to insure that the flow of the coolant fluid through the mold will be directed close to the surface of the die cavity in order to enhance the heat transfer characteristics of the mold and also to deter compacting of the particulate filler material. This can also be accomplished by forming the central protion of the lower molding block such that the body of metallic filler material follows the contour of the die cavity surface.

In molding applications where rigidity of the mold is required, the particulate filler material may be permanently fixed in position within the central portion of the molding block. In order to permanently fix the particulate filler material into a continuous rigid porous structure, the particulate material within each molding block is first coated with an epoxy resin solution, whereupon each filled molding block is subjected to elevated temperatures to cure the thin resinous coating on each filler particle and attach it to its neighboring filler particles at their points of contact. Coating of the particulate filler material in this manner reduces heat transfer substantially and should only be done when process conditions require it.

For a further understanding of the present invention and for advantages and features thereof, reference may be made to the following description in conjunction with the following drawing which show, by way of example, the preferred embodiments of the present invention.

DESCRIPTION OF THE PREFERRED EMBODIMENTS

Figure 1:
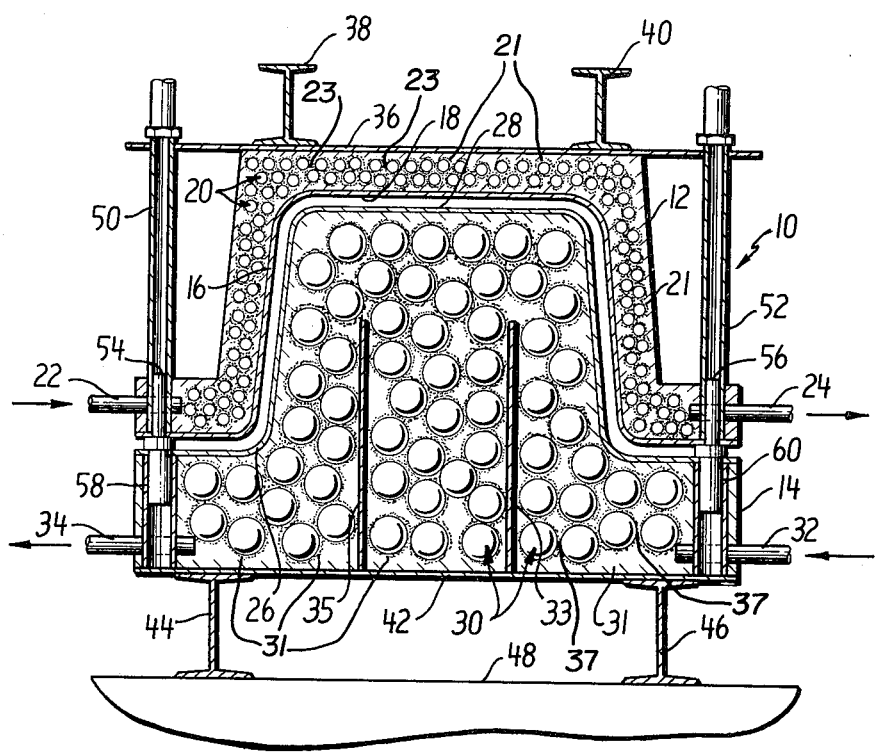
FIG. 1 is a sectional elevational view of a mold constructed in accordance with the preferred embodiments of the present invention.

Referring to the FIG. 1, the mold apparatus designated generally by the reference numeral 10 comprises an upper molding block 12 and a lower molding block 14. The body of upper molding block 12 is formed of a thin rigid shell 16 of sheet metal, such as aluminum, or of a metallic material, such as metallic flakes, that have been suitably treated to promote adhesion, and a high temperature epoxy resin. The shell may be formed entirely of epoxy resin in molding applications which do not require exceptional heat transfer characteristics. The exposed face 18 of shell 16 defines the surface of the die cavity of the upper molding block. The central portion of upper molding block 12 is filled with particulate metallic material, shown in the FIG. 1 as spherical beads 20. The spherical beads may be loosely contained within the upper molding block or they may be permanently fixed, by the method described above, into a continuous rigid porous structure. When permanently fixed, the spherical beads 20 are coated with a layer of epoxy resin 21 which holds adjacent beads together at their points of contact 23. The particulate filler material is enclosed within the central portion of upper molding block 12 by means of a shell 21 formed of a metallic material such as metallic flakes, and a high temperature epoxy resin, or entirely of an epoxy resin. A coolant fluid such as water is introduced into the central portion of the upper molding block by means of inlet tube 22, circulated through the porous body formed of the spherical beads and is withdrawn through outlet tube 24 on the opposite side of the mold.

Similarly, the body of lower molding block 14 is formed of a thin rigid shell 26 formed of the same materials used to form shell 16. The exposed face 28 of shell 26 defines the surface of the die cavity of the lower molding block which is the male to female match of the die cavity of the upper molding block. The central portion of lower molding block 14 is filled with particulate metallic material, shown in the figure as spherical beads 30. The spherical beads may be loosely contained within the lower molding block or they may be permanently fixed, by the method previously described, into a continuous rigid porous structure. When permanently fixed, the spherical beads 30 are coated with a layer of epoxy resin 31 which holds adjacent beads together at their points of contact 37. The particulate filler material is enclosed within the central portion of lower molding block 14 by means of a shell 31 formed of the same materials used to form shell 26. The central portion of lower molding block 14 is provided with baffles 33 and 35 to insure that the flow of the coolant fluid through the mold will be directed close to the surface of the die cavity in order to enhance the heat transfer characteristics of the mold and also to deter compacting of the particulate filler material. The coolant fluid is introduced into the central portion of the lower molding block by means of inlet tube 32, circulated through the porous structure formed of the spherical beads and is withdrawn through outlet tube 34 on the opposite side of the mold.

Upper molding block 12 is supported by a framework comprising an upper platen or sheet 36 made of metal or other suitable strengthening material, and supporting cross members 38 and 40. Similarly, lower molding block 14 is supported by a framework comprising a reinforcing member 42 which is suitably mounted on base members 44 and 46 which are secured to a foundation or floor 48 for substantially permanent assembly. Upper molding block 12 is the movable member of mold assembly 10 and is movable upwardly in order to separate from lower molding block 14 by means not shown. Such means are connected to cross members 38 and 40 and to upper platen 36 which is firmly connected to guide pin posts 50 and 52 on opposite sides of mold assembly 10. The guide pin posts 50 and 52 mount guide pins 54 and 56, respectively, which are received in guide pin sleeves 58 and 60, respectively, secured to opposite sides of reinforcing member 42 in order to perfect alignment between the two molding blocks 12 and 14. The supporting framework shown in FIG. 1 is representative of conventional framework used with molding apparatus and it is to be understood that any suitable supporting framework may be used to support the molding apparatus of the present invention.

Figure 2:
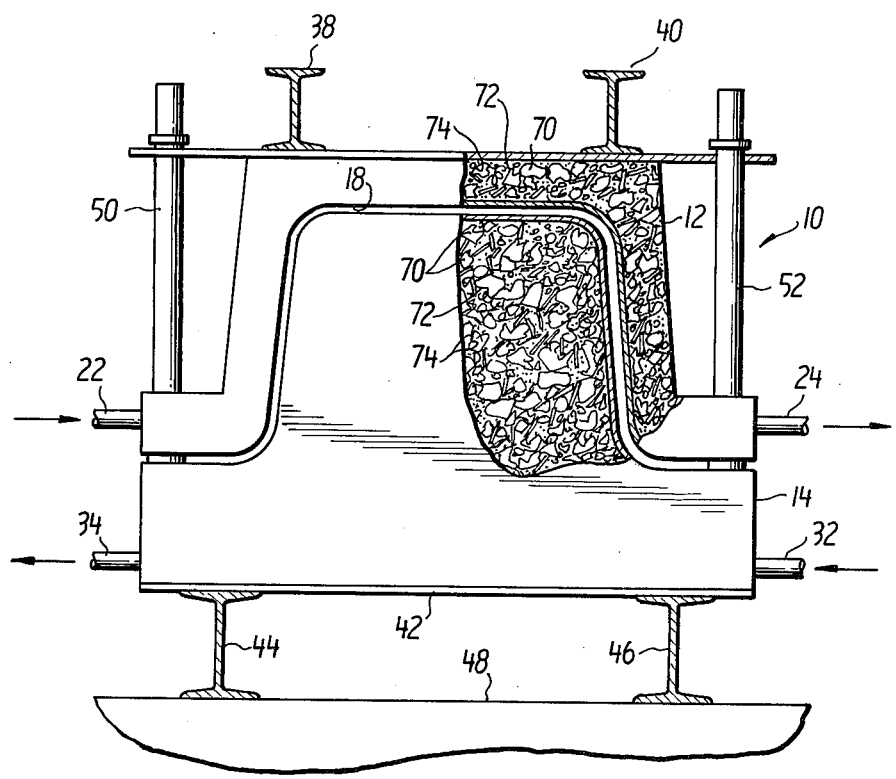
FIG. 2 is a sectional elevational view of a modification of the mold constructed according to the present invention.

FIG. 2 illustrates a modification of the particulate metallic filler material used in the upper and lower molding blocks constructed according to the present invention. A plurality of metallic filler materials of irregular shape are disposed within the upper and lower molding blocks 12 and 14 respectively. These irregular shaped filling materials 70 comprise choped wires, wool-like shavings, or irregularly shaped particles. Each of the filler materials 70 is coated with a layer of epoxy resin 72 so that it is rigidly attached to adjacent filler materials at points of contact 74 therewith. The rigid attachment of adjacent filler materials 70 together prevents the upper and lower molding blocks 12 and 14 from being compacted during the flow of current fluid therethrough or under the pressure of molding operations.

The molding apparatus of the present invention is made by first coating a pattern in the shape of the article to be molded with a gel coat of an epoxy resin paste to form a shell. The epoxy resin is applied to the pattern until the gel coat reaches a thickness of one-eighth to one-fourth inch. If superior heat transfer characteristics are desired, metallic material, such as metallic flakes, are included in the epoxy resin which is applied. Instead of the epoxy gel coat, a drawn metal sheet, such as an aluminum sheet, in the shape of the article to be molded may be used to form the shell. The shell is then filled with the porous body of metallic filler material and inlet and outlet conduits through which the coolant fluid will flow are inserted into the particulate filler material. The body of the metallic filler material is then coated with a gel coat of the epoxy resin paste to enclose it within the central portion of the molding block formed of the shell. If the mold is to be used in a pressure molding operation such as blow molding, suitable reinforcing materials may be included in the gel coats during fabrication of the mold.

The gel coats preferably are prepared from basic epoxy resin materials such as the diglycidyl ether of bisphenol A or epoxylated novolac resins, or from similar thermally suited materials such as polyimides or polyesters. The epoxy resins preferably are cured by using a reactive crosslinking agent such as acid dianhydrides and/or anhydrides, and aliphatic and/or aromatic amines, in the presence of suitable catalysts which are well known in the art.

The mold apparatus of the present invention is used in a thermoforming operating for molding a sheet of thermoplastic material, such as polystyrene, into a number of useful articles, such as egg cartons, cups and the like, in which speed of production is required. In the thermoforming operation, a sheet of thermoplastic material is first heated above its deformation temperature. In the case of polystyrene, this temperature is about 275°F. Upper molding block 12 is moved upward to an open position and the preheated thermoplastic sheet is placed between upper molding block 12 and lower molding block 14. Since the thermoforming process is a quenching process, a temperature differential of about 100°F. must be maintained between the surfaces 18 and 28 of the die cavities and the preheated thermoplastic sheet. In the case of polystyrene, therefore, the mold surfaces should be maintained at a temperature of about 170°–175°F. This is done by introducing a coolant fluid such as water into the central portions of each molding block through tubing on one side of the mold, circulating the fluid through the porous body of the metallic filler material, and withdrawing the fluid through tubing on the opposite side of the mold. The operation cooling rate of the mold is established by the flow rate of the coolant fluid through the mold. The flow of the coolant fluid through the upper molding block may be countercurrent to that through the lower molding block if such flow is required by the particular molding operation employed. After the preheated thermoplastic sheet is placed between the upper and lower molding blocks, the upper molding block is lowered and the sheet is cooled to a temperature below its deformation temperature and takes a set in a configuration conforming to the shape of the mold surface. The greater the temperature differential between the preheated thermoplastic sheet and the surface of the mold, the faster the cycle which can be adapted to the thermoforming process. Sheets of polystyrene may be thermoformed using the mold apparatus of the present invention at the rate of about 1 to 2 cycles per second.

It will be understood that modifications and variations may be effected without departing from the scope of the novel concepts of the present invention.

What is claimed is:

1. A mold for thermoforming plastic sheet material, comprising:
   upper and lower matching molding blocks, said molding blocks each comprising:
   a shell having an exterior surface and an interior surface defining a closed cavity;
   a porous body of filler material contained within said closed cavity of said shell, said filler material being in surface contact with said interior surface of said closed cavity and comprising a plurality of metallic particles, said porous body of metallic filler particles comprising a continuous rigid mass in which said plurality of metallic filler particles are attached to each other at points of surface contact by resinous material;
   inlet means for introducing coolant fluid from said molding block;
   a frame work for supporting said molding blocks at a fixed distance from each other; and wherein part of said exterior surfaces of said upper and lower matching molding blocks define a die cavity.

2. A mold according to claim 1 having at least one means for deflecting the flow of the coolant fluid toward the surface of the die cavity, said means being located within the closed cavity of at least one of said molding blocks.

3. A mold according to claim 2 in which the thin rigid shell is formed of sheet metal.

4. A mold according to claim 2 in which the thin rigid shell is formed of a metallic material, suitably treated to promote adhesion, and a high temperature epoxy resin with the metallic content being maximized.

5. A mold according to claim 4 in which the metallic material in said shell consists of metallic flakes.

6. A mold according to claim 2 in which the porous body of metallic filler material consists of particulate metallic material.

7. A mold according to claim 6 in which the particulate metallic filler material consists of spherical metallic beads.

8. In a mold as recited in claim 1 wherein said plurality of metallic filler particles comprise:
   a plurality of metallic spheres.

9. In a mold as recited in claim 1 wherein said plurality of metallic filler particles comprise:
   a plurality of irregularly shaped metallic particles.

* * * * *